US008261184B2

(12) United States Patent
Haase

(10) Patent No.: US 8,261,184 B2
(45) Date of Patent: Sep. 4, 2012

(54) APPARATUS AND METHOD FOR ENCODING AND DISPLAYING DOCUMENTS

(76) Inventor: Ignatius Xavier Haase, Hermosa Beach, CA (US)

( * ) Notice: Subject to any disclaimer, the term of this patent is extended or adjusted under 35 U.S.C. 154(b) by 2799 days.

(21) Appl. No.: 10/628,142

(22) Filed: Jul. 25, 2003

(65) Prior Publication Data

US 2004/0021310 A1 Feb. 5, 2004

Related U.S. Application Data

(60) Provisional application No. 60/400,954, filed on Aug. 2, 2002.

(51) Int. Cl.
*G06F 17/00* (2006.01)

(52) U.S. Cl. ......................... 715/232; 715/233; 715/230

(58) Field of Classification Search .................. 715/528, 715/500, 511, 513, 530–532, 204–205, 209, 715/230–234, 243, 253–255, 273, 276, 700, 715/802, 854; 345/173, 838, 179; 709/203–206, 709/219
See application file for complete search history.

(56) References Cited

U.S. PATENT DOCUMENTS

| | | | | | |
|---|---|---|---|---|---|
| 4,723,209 | A | * | 2/1988 | Hernandez et al. | 715/521 |
| 4,970,678 | A | * | 11/1990 | Sladowski et al. | 715/531 |
| 5,001,654 | A | * | 3/1991 | Winiger et al. | 715/529 |
| 5,146,552 | A | * | 9/1992 | Cassorla et al. | 715/512 |
| 5,297,249 | A | * | 3/1994 | Bernstein et al. | 715/854 |
| 5,358,280 | A | * | 10/1994 | Scales | 283/63.1 |
| 5,479,600 | A | * | 12/1995 | Wroblewski et al. | 715/787 |
| 5,486,111 | A | * | 1/1996 | Watkins | 434/157 |
| 5,533,182 | A | * | 7/1996 | Bates et al. | 715/727 |
| 5,623,679 | A | * | 4/1997 | Rivette et al. | 715/526 |
| 5,625,377 | A | * | 4/1997 | Jenson | 715/860 |
| 5,663,748 | A | * | 9/1997 | Huffman et al. | 345/173 |
| 5,745,596 | A | | 4/1998 | Jefferson | 382/176 |
| 5,761,681 | A | * | 6/1998 | Huffman et al. | 715/500 |
| 5,845,301 | A | * | 12/1998 | Rivette et al. | 715/512 |
| 5,875,428 | A | | 2/1999 | Kurzwell | 704/260 |

(Continued)

OTHER PUBLICATIONS unknown author,"Digital Talking Book Standards Committee; Document Navigation Features", NISO, Dec. 29, 1999 found at <http://www.oasis-open.org/cover/nisoDTB-nay.html>, 10 pages.*

(Continued)

*Primary Examiner* — Cesar Paula
*Assistant Examiner* — James H Blackwell
(74) *Attorney, Agent, or Firm* — David L. Hoffman; Hoffman Patent Group

(57) ABSTRACT

A method for encoding and displaying documents includes identifying multiple characteristics, such as characters, and scenery, about text of a document, creating a key for correlating the characteristics with multiple unique indicia such as color, and placing corresponding indicia to the characteristics present in a line of text in columns adjacent the line of text on the basis of the key. A system for encoding and displaying documents includes a memory containing multiple characteristics about text of a document, the document, a key for correlating the characteristics with each unique indicia, and a display showing at least some of the unique indicia adjacent at least some lines of text in the document, the unique indicia placed adjacent the line of text corresponding to the characteristics in the line of text based on the key. An encoded document has various lines of text with multiple characteristics, multiple unique indicia in a margin adjacent at least some lines of text, and the unique indicia in the margin corresponds to the multiple characteristics in the associated line of text.

8 Claims, 4 Drawing Sheets

U.S. PATENT DOCUMENTS

| | | | | |
|---|---|---|---|---|
| 5,893,132 | A * | 4/1999 | Huffman et al. | 715/532 |
| 6,085,204 | A * | 7/2000 | Chijiwa et al. | 715/529 |
| 6,094,648 | A * | 7/2000 | Aalbersberg | 707/3 |
| 6,154,757 | A * | 11/2000 | Krause et al. | 715/530 |
| 6,173,264 | B1 | 1/2001 | Kurzwell et al. | 704/260 |
| 6,177,931 | B1 * | 1/2001 | Alexander et al. | 725/52 |
| 6,177,933 | B1 | 1/2001 | Young | 345/333 |
| 6,178,431 | B1 * | 1/2001 | Douglas | 715/512 |
| 6,192,396 | B1 * | 2/2001 | Kohler | 709/206 |
| 6,199,042 | B1 | 3/2001 | Kurzwell | 704/260 |
| 6,230,170 | B1 * | 5/2001 | Zellweger et al. | 715/512 |
| 6,330,576 | B1 * | 12/2001 | Mochizuki et al. | 715/529 |
| 6,356,287 | B1 * | 3/2002 | Ruberry et al. | 715/864 |
| 6,405,199 | B1 * | 6/2002 | Carter et al. | 707/6 |
| 6,426,761 | B1 * | 7/2002 | Kanevsky et al. | 715/788 |
| 6,481,011 | B1 * | 11/2002 | Lemmons | 725/47 |
| 6,529,215 | B2 * | 3/2003 | Golovchinsky et al. | 715/764 |
| 6,639,139 | B2 * | 10/2003 | Muller | 84/483.1 |
| 6,658,623 | B1 * | 12/2003 | Schilit et al. | 715/513 |
| 6,714,214 | B1 * | 3/2004 | DeMello et al. | 715/711 |
| 6,820,237 | B1 * | 11/2004 | Abu-Hakima et al. | 715/531 |
| 6,823,331 | B1 * | 11/2004 | Abu-Hakima | 707/3 |
| 6,883,138 | B2 * | 4/2005 | Rosenholtz et al. | 715/526 |
| 6,918,083 | B2 * | 7/2005 | Smith | 715/511 |
| 6,950,982 | B1 * | 9/2005 | Dourish | 715/512 |
| 7,080,317 | B2 * | 7/2006 | Lebow | 715/512 |
| 7,188,306 | B1 * | 3/2007 | Chang et al. | 715/512 |
| 2002/0049787 | A1 * | 4/2002 | Keely et al. | 707/512 |
| 2002/0067380 | A1 * | 6/2002 | Graham | 345/838 |
| 2003/0009459 | A1 * | 1/2003 | Chastain et al. | 707/7 |
| 2003/0025731 | A1 * | 2/2003 | Chastain et al. | 345/764 |
| 2003/0203343 | A1 * | 10/2003 | Milner | 434/157 |
| 2004/0087838 | A1 * | 5/2004 | Galloway et al. | 600/300 |
| 2004/0194021 | A1 * | 9/2004 | Marshall et al. | 715/512 |
| 2004/0201633 | A1 * | 10/2004 | Barsness et al. | 345/864 |
| 2004/0205545 | A1 * | 10/2004 | Bargeron et al. | 715/512 |
| 2004/0205647 | A1 * | 10/2004 | Smith | 715/530 |
| 2006/0053364 | A1 * | 3/2006 | Hollander et al. | 715/512 |

OTHER PUBLICATIONS

Golovchinsky et al.,"Moving Markup: Repositioning Freeform Annotations", UIST '02, Oct. 27-30, 2002, ACM, pp. 21-29.*

Chi et al.,"ScentHighlights: Highlighting Conceptually-Related Sentences During Reading", IUI '05, Jan. 10-13, 2005, ACM, 3 pages.*

Woods,"12 Ways to Study LDS Scriptures", date unknown, found at <http://lds.about.com/cs/idsscriptures/a/scripture_study.htm>, 2 pages.*

* cited by examiner

FIG. 4

| | | | |
|---|---|---|---|
| PINK | = Character R | BLACK | = Change of Scene (CS) |
| BLUE | = Character G | RED | = Conflict (CN) |
| GREEN | = Character F | YELLOW | = Climax (CL) |
| GRAY | = Character X | ORANGE | = Narrator (NA) |
| WHITE | = Character Y | VIOLET | = Resolution (RS) |
| PURPLE | = Character Group 1 (G1) | BROWN | = Characteristic or Element Z |
| TAN | = Character Group 2 (G2) | | |

FIG. 5

| l | k | MARGIN j | TEXT | line |
|---|---|---|---|---|
| | | ORANGE | | 101 |
| | | ORANGE | | 102 |
| | RED | ORANGE | | 103 |
| | RED | ORANGE | | 104 |
| | BLACK | ORANGE | | 105 |
| RED | BLUE | GREEN | | 106 |
| | BLACK | ORANGE | | 107 |
| | BLUE | GRAY | | 108 |
| | | WHITE | | 109 |
| | WHITE | ORANGE | | 110 |
| | GRAY | WHITE | | 111 |
| RED | BLACK | PINK | | 112 |
| | ORANGE | PURPLE | | 113 |
| BROWN | BLACK | ORANGE | | 114 |
| | TAN | ORANGE | | 115 |
| | | PURPLE | | 116 |
| VIOLET | BLACK | ORANGE | | 117 |

APPARATUS AND METHOD FOR ENCODING AND DISPLAYING DOCUMENTS

CROSS-REFERENCE TO RELATED APPLICATIONS

This application is a utility application claiming priority from U.S. Provisional Patent Application Serial No. 60/400,954 filed Aug. 2, 2002, and incorporated by reference herein, including its appendices.

BACKGROUND OF THE INVENTION

1. Field of the Invention

This invention relates to devices and methods used to designate or label selected portions of text documents and preferably to documents for use with an electronic display device.

2. Description of the Related Art

The ability to read is a necessity in modern society, and doing so efficiently is critically important to students, professionals, and even recreational readers. As a result, many tools have proliferated to achieve that goal such as condensed books, educational outlines and Cliffs Notes™, to name but a few. While these approaches reduce the amount that one has to read to a minimum, they do so by excising much of the original documents. For example, condensing a novel such as "Lord of the Rings" can result in a summary that contains the main elements of the plot and is easy to read, but the subplots and nuances of the work will be unavailable to the reader.

In addition, it has long been known that readers can highlight text. For example, readers put yellow hi-liter over selected words, phrases or other portions of the text. Readers may also underline and/or circle text of interest. However, this is on an individual basis. Moreover, it is not systemized. Further it can detract from reading other portions of the text or reading the highlighted portions themselves. It is also difficult to provide two or more types of highlighted or emphasis on the same text because highlighting is provided on the text.

What is needed is a way to systematically "highlight" or otherwise emphasize or outline the elements of a story, desired portions of a treatise such as legal, medical or scientific journals, or virtually any text.

SUMMARY OF THE INVENTION

In one embodiment, the present invention provides a method for labeling or identifying characteristics or elements of text in a document and displaying the labeled document to a reader, while allowing the entire document to remain available for display and unencumbered by highlighting or other indicia placed in the text. In accordance with an embodiment of the invention, literature and other written material is provided with colored areas (or gray scales) in the left margin, or on one or both sides of the text. These colored areas or bars designate various characteristics or elements of the text. They can be used to identify the speaker, whether it is a character, characters or the narrator. It can also be used to identify different literary aspects of a story, poem, script, etc., such as conflict, climax and resolution, change of scenes or scenery, etc. It can also be used to emphasize and label technical information in any form of written material. Multiple colored segments may be placed adjacent the text (to the left or right of a line of text) to indicate multiple characteristics or elements in the same line of text.

In a preferred embodiment, the method includes labeling the subject areas of a document, such as a novel, converting the document to electronic data, then entering the data into a memory device, preferably a computer disc. The memory device is then obtained by the user and connected to a processing unit (e. g., in a computer or electronic book) containing an encoding program. The user then displays the text with the marginal color codes. In another embodiment, e,g., Microsoft Excel® software is used to insert visual codes corresponding to the previously entered labeling, and the modified document is saved, e.g., using Microsoft Word® software, on the memory device for future viewing, on an electronic display device, or as a physical document generated from the data on the memory device.

BRIEF DESCRIPTION OF THE DRAWINGS

The drawings, appended hereto, are as follows:

FIG. 4 is an exemplary key table relating a story element or characteristic to an encoding marker (e.g., color) for use in the inventive method;

FIG. 5 is a schematic diagram showing encoding markers adjacent associated lines of text;

DETAILED DESCRIPTION

Figure 1:
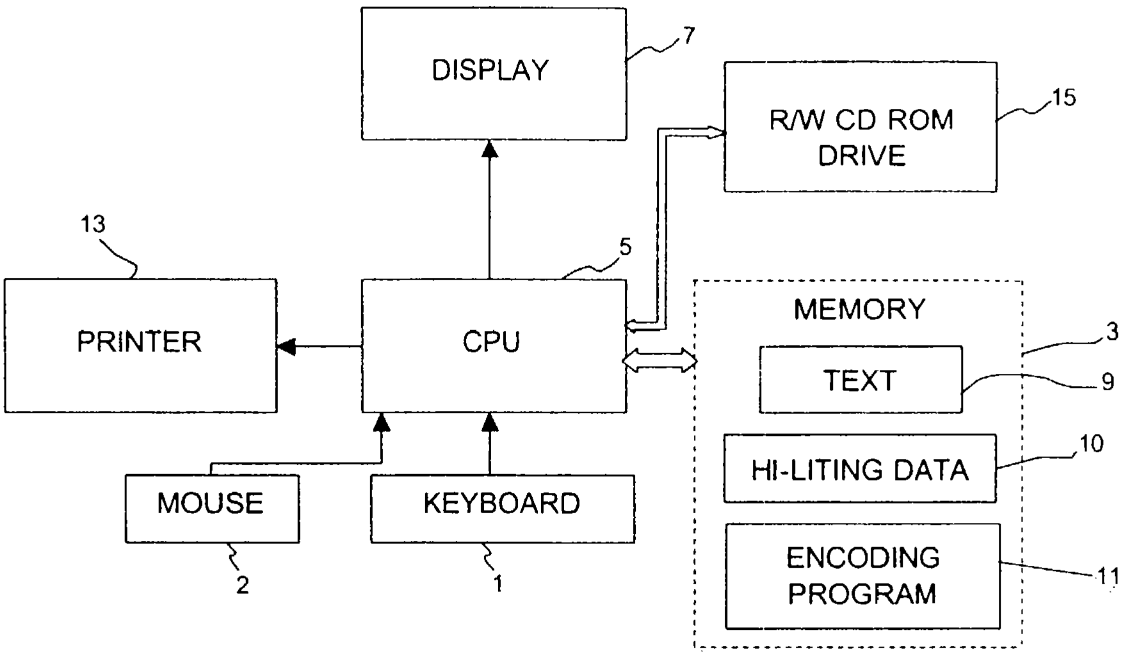
FIG. 1 is a schematic diagram of an exemplary embodiment of a system for employing a method for encoding documents for display with highlighting system of the invention.

In a preferred embodiment, a system for encoding text includes a central processing unit (CPU), such as a computer, an input device or devices, such as a keyboard and mouse, a display, a data memory device such as a disc, a read-write CD-ROM drive, an encoding program and a printing device. An exemplary configuration of a system for encoding text is illustrated in FIG. 1.

A keyboard 1, mouse 2 and memory 3 are connected to a CPU 5. CPU 5 is connected to a display 7 in a conventional manner. Memory 3 contains text data 9, and is connected to the CPU by a conventional interface. Memory 3 will also contain hi-liting data 10 (explained below), and an encoding program 11. The various data may be stored in a separate memory, or may be stored in a single memory device or machine-readable memory device such as a disc. A printer 13 may be connected to CPU 5.

Keyboard 1 and mouse 2 allow a user to input commands to CPU 5 to control memory 3. A recordable memory device such as read/write CD-ROM drive 15 is also connected to the CPU. In place of the read/write CD-ROM drive, any other machine-readable and recordable memory device may be used.

CPU 5 executes the commands received from keyboard 1 and mouse 2, and display 7 may provide real-time feedback regarding the encoding process, and can also present the encoded data to the user in text form. Alternatively, printer 13 can be used to provide a physical copy of the encoded text if preferred.

Figure 2:
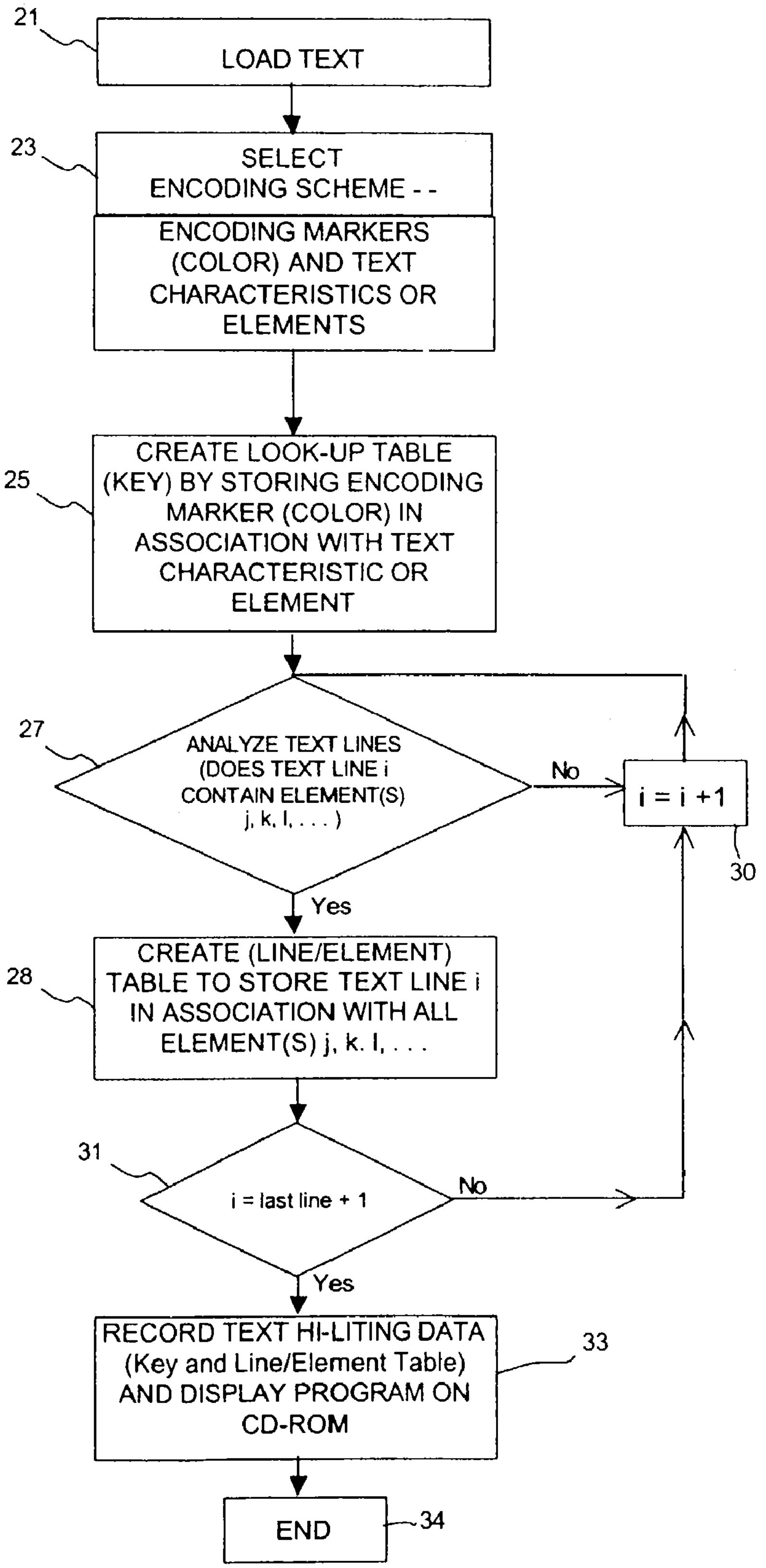
FIG. 2 is a flow chart showing an exemplary process for encoding documents.

The flow chart of FIG. 2 illustrates how a method for encoding text is performed. At step 21, the user loads text in memory section 9. At step 23, the user selects an encoding scheme, i.e., an encoding marker such as color or a shade of gray, and text or story characteristics or elements such as a speaker, a location, a character speaking, or any characteristic or element of the text including a narrator, a change of scene, a conflict, climax, resolution, a group of characters, that the user or another wishes to identify. The label encoding marker is preferably a color, and is preferably for placement in the margin adjacent a line of text. Memory device 3 is then interfaced with CPU 5, and at Step 25 the author enters commands into keyboard 1 that instruct the encoding program 11 to create a look-up table (key) (as shown in FIG. 4) between desired codes (e.g., colors or shades of gray) and various text or story characteristics or elements, such as narrator (NA), characters speaking, which may be individual characters (R, G, F, X, Y) or groups of characters (G1, G2) change in scene or scenery (CS), conflict (CN), resolution (RS), climax (CL) or other characteristic or element (Z). Codes may be various colors, or shades of gray and are to be placed within the margin adjacent the applicable text (FIG. 5). The author then inputs a command via keyboard 1 and/or mouse 2 instructing CPU 5 to save the newly coded data in a "highlighting data" segment 10 of memory 3.

Figure 3:
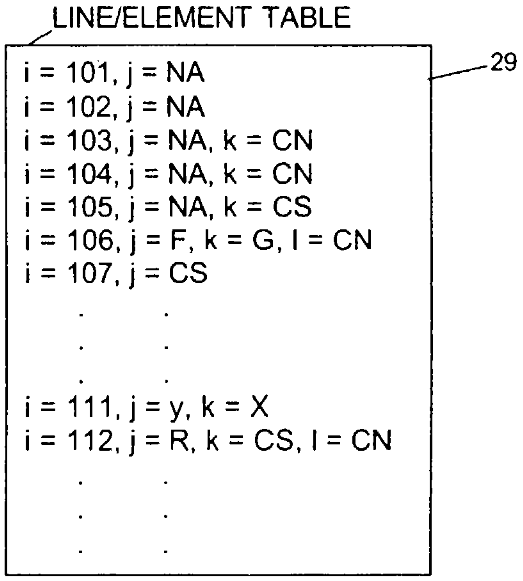
FIG. 3 is an exemplary line/element look-up table for use in the inventive method.

Key or look-up table relates color or shade of gray to a characteristic or element of text. The color or shade of gray must then be related to a specific line of text where that characteristic or element occurs. Accordingly, at Step 28, encoding program 11 is used to create a look-up table where line number and elements are correlated. Such a look-up table 29 is shown in FIG. 3. At Step 27, before Step 28, text line number "i" is related to text element or characteristic "j." Element or characteristic j is represented by a colored or grayed area adjacent the text, e.g., in the left margin. Additional text elements or characteristics, k, 1, etc., may exist in any line, and thus additional colored or grayed areas in accordance with the key look-up table may also be placed adjacent the corresponding text line. Once a line is done, the process must ask if the last line of text has been completed (Step 31), and if not, "i" is incremented by one (Step 30) and Step 27 is repeated until the last line is done.

FIG. 5 shows an example for text lines 101 et seq. The line/element table 29 of FIG. 3 is also preferably stored in the highlighting data memory section 10. In essence, the key and the line/element table 29 provide the necessary highlighting data to display the encoded text. The invention can be implemented, e.g., using Microsoft Word® to display the text file, and Microsoft Excel® to provide color coding adjacent the text.

Once the document is coded, an electronic coded document may be created by recording the data on a machine readable, memory device, such as a CD-ROM, using CD-ROM drive 15 (at Step 33). The data on the CD-ROM would include the text, and the key and line/element look-up tables. A display program may also be recorded on the CD-ROM, or it can be sold or provided separately to potential users. For example, if Microsoft Word® and/or Microsoft Excel® are used, these typically would be available on the user's computer already. Alternatively, display software could be made available via the Internet, either as shareware or for a fee.

Figure 6:
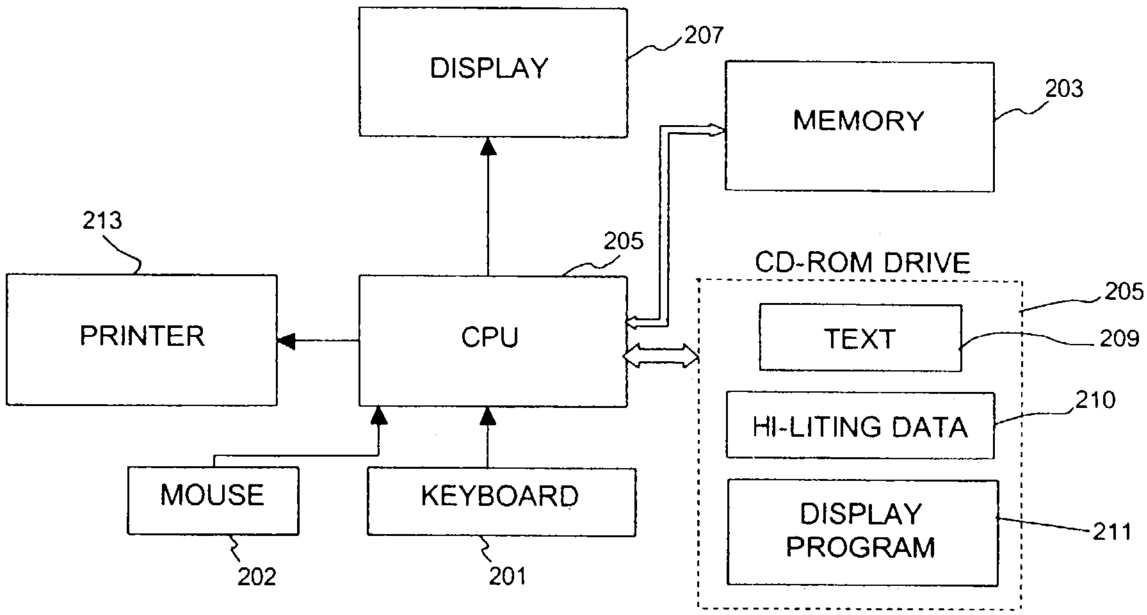
FIG. 6 is a schematic diagram showing steps of a program for displaying documents with the highlighting system according to the invention.
Figure 7:
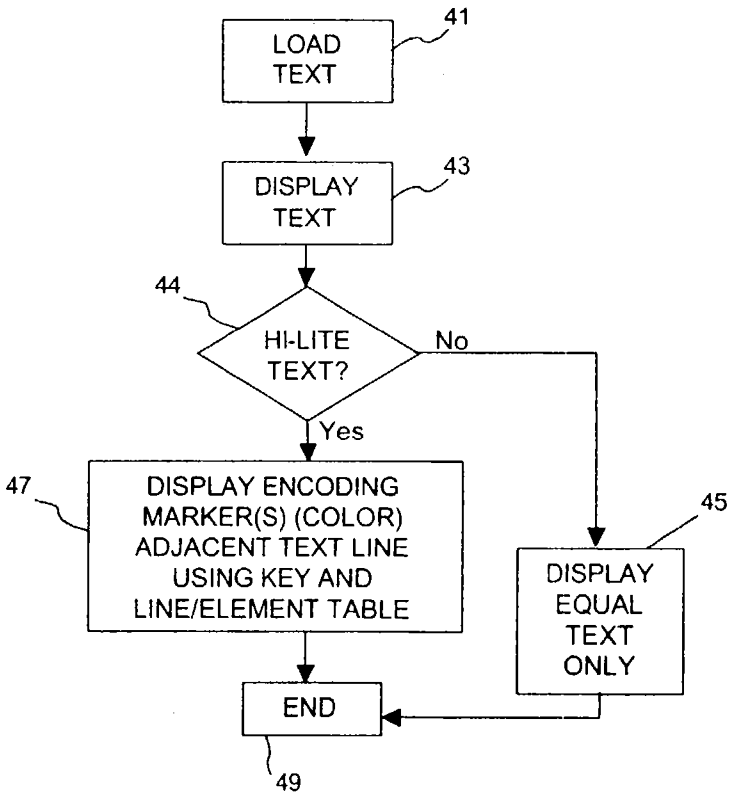
FIG. 7 is a flow chart showing an exemplary process for displaying documents with the encoding markers in accordance with the invention.

When the user obtains the CD-ROM, the user loads it into his or her CD-ROM drive 205' on his or her computer as shown in FIG. 6. The computer typically includes a mouse 202, a keyboard 201, a CPU 205, a memory 203, a CD-ROM drive 205', a display 207, and a printer 213. The steps that the display program follows are shown in FIG. 7. The document will look as shown schematically in FIG. 5.

With reference to FIG. 7, at Step 41 the user loads the text. At Step 43, the user displays the text. At Step 44, the display program may provide an option to display the text with or without the color coding, and if selected, it is displayed at Step 47 using the key and line/element look up tables. It may also be an option to select the color scheme and/or shades of gray for display. At Step 44, if the user chose not to highlight, the text is displayed without highlighting (Step 45).

The method for encoding text can be used in a variety of scenarios. For example, a teacher can use the encoding method to check their students comprehension by requiring students to apply the process to literature or text. The encoded text could then be checked in electronic format or by computer for accuracy. Encoded text could also be printed out for further reference.

Publishers can use the process to print books and materials to increase a reader's enjoyment and comprehension of the text. For example, a publisher of legal materials could identify facts, issues, holding and dicta in a published case, allowing a lawyer or law student to pinpoint areas of particular interest, while still having the entire document available.

The encoding process will also heighten interest in electronic books, as this process will make reading books from electronic book devices easier, more active, and much more enjoyable.

The inventive system works well to avoid making a mess of a highlighted page. For example, where there are multiple columns of highlighting in the margin the highlighting can be digitally controlled. This is especially true for places where there are three or more columns of highlighting. In addition, the inventive system works well where a substantial portion of a chapter of a book, or all of a book, or all of a work is highlighted. Because the characters, scene, and/or some other aspect of the plot or work is always present on each line of text, ideally all or substantially all lines of text on a chapter, section or book, or other work will be highlighted, and at least about half or more than half of the lines in a chapter, section or book, or other work will be highlighted.

While the present invention has been described with regard to particular embodiments, it is recognized that additional variations of the present invention may be devised without departing from the inventive concept.

What is claimed is:

1. A method of encoding a document comprising the steps of:

identifying multiple characteristics about text of the document;

creating a key for correlating the multiple characteristics with multiple unique indicia; and placing at least some of the unique indicia adjacent at least some lines of text in the document, wherein the unique indicia placed adjacent each line of text correspond to the characteristic or characteristics in the line of text on the basis of the key, wherein there is at least one line of text having at least two unique indicia adjacent thereto, wherein in the steps of creating and placing, the unique indicia comprise color-coded segments, and the color-coded segments are placed in a margin adjacent to and in line with the text of the line, and wherein there are at least some color-coded segments placed contiguously with the same color-coded segments from adjacent lines of text and in a columnar arrangement perpendicular to the lines of text, so as to form continuous segments of color-coding, and at least some lines of text have at least two characteristics and a corresponding number of unique indicia in the margin adjacent the lines.

2. The method of claim 1, wherein the document is stored on a digital medium, and in the steps of creating and placing, the key is stored on a digital medium, and the unique indicia are stored in a digital medium.

3. The method of claim 2, further comprising a step of selectively changing the key by changing at least one of the color-coding and the characteristics.

4. The method of claim 3, wherein the characteristics of each line are stored in a digital recording medium, and there is a step of selectively placing a plurality of the unique indicia corresponding to the multiple characteristics, based on the key, adjacent at least some of the lines of text.

5. The method of claim 1, further comprising a step of storing the document on a digital recording medium.

6. A system for encoding and displaying a document comprising:

a memory containing a document and multiple characteristics about text of the document each in relation to a unique indicia, and containing a key for correlating the multiple characteristics with each of the unique indicia;

a display showing at least some of the unique indicia adjacent at least some lines of text in the document, wherein the unique indicia placed adjacent each line of text correspond to the characteristic or characteristics in the line of text on the basis of the key, wherein there is at least one line of text having at least two unique indicia adjacent thereto, wherein the unique indicia comprise color-coded segments, and the color-coded segments are placed in a margin adjacent to and in line with the text of the line, and wherein there are at least some color-coded segments placed contiguously with the same color-coded segments from adjacent lines of text and in a columnar arrangement perpendicular to the lines of text, so as to form continuous segments of color-coding, and at least some lines of text have at least two characteristics and a corresponding number of unique indicia in the margin adjacent the lines.

7. The system of claim 6 wherein the memory comprises a digital recording medium, and the system further comprises a processor for controlling the display, and for selectively changing at least one of the characteristics and the unique indicia in the key.

8. The system of claim 6 further comprising a controller for enabling a user to select a plurality of the multiple characteristics, and for changing the display based on the selection to show the unique indicia which correspond to the selected multiple characteristics.

* * * * *